United States Patent
Sakai et al.

(10) Patent No.: US 9,486,744 B2
(45) Date of Patent: Nov. 8, 2016

(54) SEPARATION MEMBRANE MANUFACTURING METHOD

(71) Applicant: NGK Insulators, Ltd., Nagoya (JP)

(72) Inventors: Tetsuya Sakai, Nagoya (JP); Hideyuki Suzuki, Nagoya (JP); Akimasa Ichikawa, Nagoya (JP); Naoto Kinoshita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 39 days.

(21) Appl. No.: 14/496,528

(22) Filed: Sep. 25, 2014

(65) Prior Publication Data

US 2015/0056372 A1 Feb. 26, 2015

Related U.S. Application Data

(63) Continuation of application No. PCT/JP2013/052423, filed on Feb. 1, 2013.

(30) Foreign Application Priority Data

Mar. 29, 2012 (JP) ................................. 2012-078272

(51) Int. Cl.
  *B01D 67/00* (2006.01)
  *B01D 63/06* (2006.01)
  (Continued)

(52) U.S. Cl.
  CPC ......... *B01D 67/0044* (2013.01); *B01D 63/066* (2013.01); *B01D 67/0002* (2013.01); *B01D67/0067* (2013.01); *B01D 71/021* (2013.01); *B01D 71/64* (2013.01); *B01D 61/362* (2013.01); *B01D 2323/08* (2013.01)

(58) Field of Classification Search
  CPC .................................................. B01D 63/066
  See application file for complete search history.

(56) References Cited

U.S. PATENT DOCUMENTS

| 3,234,181 | A | * | 2/1966 | Olivier ............................ 260/47 |
| 2008/0152865 | A1 | * | 6/2008 | Takeno ............... B01D 63/066 428/134 |
| 2012/0009346 | A1 | | 1/2012 | Nagasaka et al. |

FOREIGN PATENT DOCUMENTS

| EP | 0 474 424 A2 | 3/1992 |
| JP | 2003-286018 A1 | 10/2003 |

(Continued)

OTHER PUBLICATIONS

International Search Report and Written Opinion (Application No. PCT/JP2013/052423) dated Apr. 9, 2013.

(Continued)

*Primary Examiner* — Alex A Rolland
(74) *Attorney, Agent, or Firm* — Burr & Brown, PLLC (57) ABSTRACT

Provided is a separation membrane manufacturing method capable of easily manufacturing a dense separation membrane. The separation membrane manufacturing method comprises a membrane forming step of forming a separation membrane precursor containing a separation membrane precursor solution on the surface of cells formed in a porous monolith substrate; and a drying step of performing ventilation drying by passing hot air through the cells having the separation membrane precursor in the monolith substrate to dry the separation membrane precursor. During the ventilation drying in the drying step, the temperature of the monolith substrate having the separation membrane precursor is raised to 90° C. within 15 minutes from the start of the passing of the hot air at such a rate of temperature rise that an average rate of temperature rise is 7° C./min or more from the start of the passing of the hot air until the temperature reaches 90° C.

13 Claims, 5 Drawing Sheets

(51) Int. Cl.
    *B01D 71/02* (2006.01)
    *B01D 71/64* (2006.01)
    *B01D 61/36* (2006.01)

(56) References Cited

FOREIGN PATENT DOCUMENTS

| JP | 2010-089000 A1 | 4/2010 |
|---|---|---|
| JP | 2010-099559 A1 | 5/2010 |
| JP | 2010-110704 | 5/2010 |
| JP | 2011/118252 A1 | 9/2011 |
| WO | 2008/078442 A1 | 7/2008 |

OTHER PUBLICATIONS

Extended European Search Report (Application No. 13769402.2) dated Nov. 5, 2015.
Canadian Office Action (Application No. 2,868,974) dated Jul. 13, 2016.

\* cited by examiner

SEPARATION MEMBRANE MANUFACTURING METHOD

BACKGROUND OF THE INVENTION

1. Field of the Invention

The present invention relates to a separation membrane manufacturing method. More specifically, the present invention relates to a separation membrane manufacturing method capable of easily manufacturing a dense separation membrane.

2. Description of Related Art

In recent years, production of ethanol using biomass technology has drawn attention from the viewpoint of environmental protection and effective utilization of scrap wood. A method of using selective permeability of a zeolite membrane has been known as a method for recovering the ethanol produced by such biomass technology. The method comprises bringing a liquid mixture containing water and ethanol obtained from woody biomass into contact with the zeolite membrane to selectively pass water alone through the membrane, thus separating ethanol from water.

The liquid mixture obtained from woody biomass contains organic acids such as acetic acid along with water and ethanol. A zeolite membrane generally has poor resistance to acids, and thus the organic acids may lower separation performance of the membrane or cause early deterioration of the membrane.

There, a carbon membrane that has been mainly used for separating a particular component from a gas mixture is now studied about the separation of organic solvents such as ethanol from water. A carbon membrane has higher acid resistance than that of a zeolite membrane and provides stable separation performance over a long period of time even in the presence of organic acids. For such a purpose, the carbon membrane is typically used as a carbon membrane provided on the surface of cells formed in a porous monolith substrate.

The method of manufacturing such a separation membrane is exemplified by a carbon membrane manufacturing method as below. First, by passing a separation membrane precursor solution through a plurality of cells formed in a porous monolith substrate, a separation membrane precursor is formed on the surface of the cells. The separation membrane precursor is exemplified by a polyamic acid membrane. Next, the monolith substrate is placed in a dryer, and the separation membrane precursor is dried. Then, the dried separation membrane precursor is thermally decomposed under a reducing atmosphere such as a nitrogen atmosphere to be carbonized, yielding a carbon membrane (for example, see Patent Document 1).

In a separation membrane manufacturing method in Patent Document described above is difficult to uniformly dry the whole membrane, and this adversely affects the separation performance of the resulting separation membrane. Therefore, separation membrane manufacturing methods in which drying of the separation membrane precursor is performed by ventilation drying in which hot air is passed through the cells have been suggested (for example, see Patent Documents 2 and 3). In such a conventional separation membrane manufacturing method, the step of forming a separation membrane precursor and the step of drying the separation membrane precursor are repeated a plurality of times, and consequently a separation membrane having an intended separation performance is manufactured. Hereinafter, the step of forming a separation membrane precursor may be called "membrane forming step", and the step of drying a separation membrane precursor may be called "drying step".

CITATION LIST

Patent Documents

[Patent Document 1] JP-A-2003-286018
[Patent Document 2] WO 2008/078442
[Patent Document 3] JP-A-2010-89000

SUMMARY OF THE INVENTION

Problem to be Solved by the Invention

However, in order to manufacture a dense separation membrane by the conventional separation membrane manufacturing method, there was a problem that the membrane forming step and the drying step needed to be repeated a large number of times. In other words, there was a problem that the conventional separation membrane manufacturing method failed to provide a dense separation membrane having an intended separation performance if the membrane forming step and the drying step are insufficiently repeated. As described above, in the conventional separation membrane manufacturing method, the membrane forming step and the drying step are required to be repeated a large number of times, which complicates the manufacturing process. Hence, there is a demand for a manufacture method capable of yielding a dense separation membrane through a simpler process.

In view of the above problems, the present invention provides a separation membrane manufacturing method capable of easily manufacturing a dense separation membrane. More specifically, the present invention provides a separation membrane manufacturing method capable of manufacturing a dense separation membrane even when the membrane forming step and the drying step are repeated a small number of times.

Means for Solving the Problem

The present invention provides the following separation membrane manufacturing method.

According to a first aspect of the present invention, a separation membrane manufacturing method including: a membrane forming step of applying a separation membrane precursor solution onto a surface of cells formed in a porous monolith substrate to form a separation membrane precursor containing the precursor solution on the surface of the cells is provided; and a drying step of performing ventilation drying by passing hot air through the cells having the separation membrane precursor in the monolith substrate to dry the separation membrane precursor, wherein, during the ventilation drying in the drying step, a temperature of the monolith substrate having the separation membrane precursor is raised to 90° C. within 15 minutes from the start of the passing of the hot air at such a rate of temperature rise that an average rate of temperature rise is 7° C./min or more from the start of the passing of the hot air until the temperature reaches 90° C.

According to a second aspect of the present invention, the separation membrane manufacturing method according to the first aspect is provided, wherein the membrane forming step and the drying step are regarded as a set of steps, and the set of steps is repeated twice or more.

According to a third aspect of the present invention, the separation membrane manufacturing method according to the first or second aspects is provided, further comprising a carbonization step of thermally decomposing the separation membrane precursor dried in the drying step to be carbonized, yielding a separation membrane.

According to a fourth aspect of the present invention, the separation membrane manufacturing method according to any one of to the first to third aspects is provided, wherein the precursor solution is a polyamic acid solution.

According to a fifth aspect of the present invention, the separation membrane manufacturing method according to the fourth aspect is provided, wherein the separation membrane precursor is dried and imidized in the drying step.

According to a sixth aspect of the present invention, the separation membrane manufacturing method according to any one of the first to fifth aspects is provided, wherein the temperature of the monolith substrate having the separation membrane precursor is raised to 90° C. within 60 minutes from the start of the applying of the precursor solution onto the surface of the cells.

According to a seventh aspect of the present invention, the separation membrane manufacturing method according to any one of the first to sixth aspects is provided, wherein an outer peripheral surface of the monolith substrate is sealed, and then the membrane forming step is performed.

Effect of the Invention

According to the separation membrane manufacturing method of the present invention, a dense separation membrane can be easily manufactured. More specifically, in the separation membrane manufacturing method of the present invention, the ventilation drying in the drying step is performed as follows. That is, the temperature of a monolith substrate having a separation membrane precursor is raised to 90° C. within 15 minutes from the start of passing of hot air at such a rate of temperature rise that the average rate of temperature rise is 7° C./min or more from the start of the passing of the hot air until the temperature reaches 90° C. Such a structure enables easy manufacture of a dense separation membrane. For example, in the conventional separation membrane manufacturing method it was difficult to obtain a dense separation membrane unless the membrane formation and the drying of the separation membrane precursor are repeated a large number of times. According to the separation membrane manufacturing method of the present invention, a dense separation membrane can be obtained even if the membrane formation and the drying are repeated a smaller number of times than that of the conventional separation membrane manufacturing method. In addition, since the number of times of repeating the membrane formation and the drying can be reduced the separation performance of the resulting separation membrane can be improved.

DETAILED DESCRIPTION OF THE INVENTION

Embodiments for carrying out the present invention will next be described in detail with reference to drawings. The present invention should not be limited to the following embodiments, and it should be understood that appropriate changes and modifications may be made on the basis of common knowledge of a person skilled in the art without departing from the scope of the present invention.

(1) Separation Membrane Manufacturing Method

Figure 1:
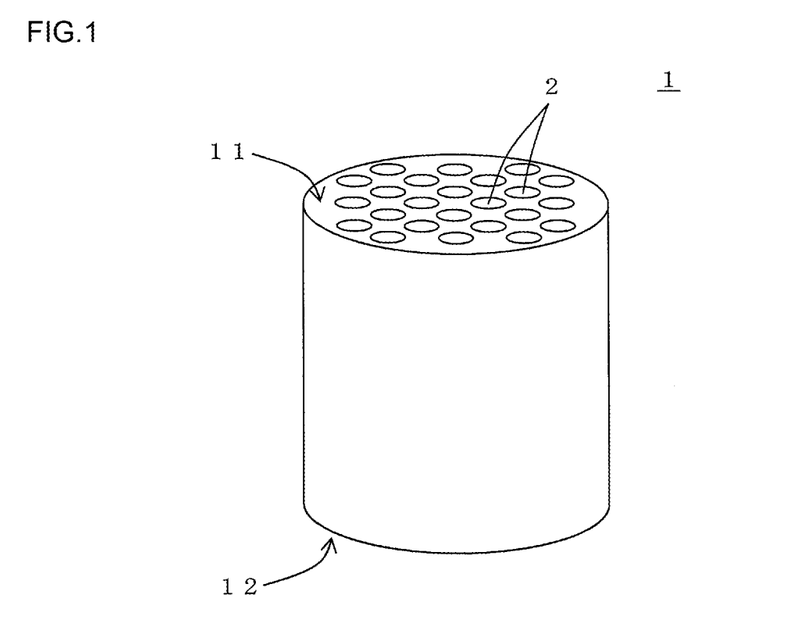
FIG. 1 is a schematic perspective view illustrating a monolith substrate used in an embodiment of the separation membrane manufacturing method of the present invention.

An embodiment of the separation membrane manufacturing method of the present invention is a separation membrane manufacturing method comprising a membrane forming step and a drying step. The separation membrane manufacturing method of the present embodiment is a separation membrane manufacturing method that forms a separation membrane on the surface of cells 2 in a monolith substrate 1 as shown in FIG. 1. FIG. 1 is a schematic perspective view illustrating a monolith substrate used in an embodiment of the separation membrane manufacturing method of the present invention.

The membrane forming step in the separation membrane manufacturing method of the embodiment is a step of applying a separation membrane precursor solution onto the surface of cells formed in a porous monolith substrate to form a separation membrane precursor containing the precursor solution on the surface of the cells. The drying step in the separation membrane manufacturing method of the embodiment is a step of performing ventilation drying by passing hot air through the cells having the separation membrane precursor in the monolith substrate to dry the separation membrane precursor.

In the separation membrane manufacturing method of the embodiment, the ventilation drying in the drying step is performed as follows. In other words, the temperature of the monolith substrate having the separation membrane precursor is raised to 90° C. within 15 minutes from the start of the passing of the hot air at such a rate of temperature rise that the average rate of temperature rise is 7° C./min or more from the start of the passing of the hot air until the temperature reaches 90° C. Such a constitution enables easy manufacture of a dense separation membrane. For example, in the conventional separation membrane manufacturing method it was difficult to give a dense separation membrane unless the membrane formation and the drying of the separation membrane precursor are repeated a large number of times. In the conventional separation membrane manufacturing method, the drying conditions were controlled only by the temperature and the speed of hot air for drying the separation membrane precursor, and the temperature of the monolith substrate having the separation membrane precursor was not considered at all. As a result of various studies on the separation membranes manufactured by ventilation drying, it has been found that highly reproducible manufacture of a dense separation membrane is extremely difficult by merely controlling the temperature and the speed of hot air. It has also been found that, in the drying step by the ventilation drying, the rate of temperature rise and the temperature rise time of the monolith substrate having the separation membrane precursor greatly affect the denseness of the resulting separation membrane. Particularly, by specifying the average rate of temperature rise until the temperature of the monolith substrate reaches 90° C. to the above value during the ventilation drying, a dense separation membrane can be successfully obtained.

By the separation membrane manufacturing method of the present invention, a dense separation membrane can be obtained even if the membrane formation and the drying are repeated a smaller number of times than that of the conventional separation membrane manufacturing method. In other words, the separation membrane manufacturing method of the embodiment suppresses infiltration of the separation membrane precursor into the monolith substrate and thus can perform the ventilation drying while maintaining the thickness of the separation membrane precursor. This can reduce the loss of a precursor solution for forming the separation membrane precursor. Moreover, since the thickness of the separation membrane formed by a single membrane forming step increases a dense separation membrane can be obtained even if the membrane formation and the drying are repeated a smaller number of times.

One of the reasons for that the separation membrane manufacturing method of the embodiment can give a dense separation membrane is thought to be that the infiltration of the separation membrane precursor into the monolith substrate is suppressed during the drying step. In other words, to manufacture a separation membrane, as described above, a precursor solution is applied onto the surface of cells formed in a porous monolith substrate to form a separation membrane precursor, then the obtained separation membrane precursor is dried, and thus the separation membrane precursor is fixed on the surface of the cells. However, the monolith substrate is porous, and thus the separation membrane precursor (that is, the precursor solution used for forming the separation membrane precursor) may be gradually infiltrated through the surface of the cells into pores of the porous body until the separation membrane precursor is completely dried. Therefore, by suppressing the infiltration of the separation membrane precursor (that is, the precursor solution) into the pores of the porous body, the resulting separation membrane becomes dense. In addition, the suppression of the infiltration of the separation membrane precursor into the pores of the porous body during the drying step allows reduction in the required number of times of repeating the membrane forming step and the drying step.

In the present specification, the term "dense separation membrane" means a separation membrane having a thickness sufficient for exhibiting a separation performance that the separation membrane is required to have. In other words, when a separation membrane is used to separate a particular component from a subject to be separated containing a plurality of components, a separation membrane through which the particular component permeates and through which components except the particular component fail to permeate is called the dense separation membrane.

In the separation membrane manufacturing method of the embodiment, the membrane forming step and the drying step may be regarded as a set of steps, and the set of steps may be repeated twice or more. For example, first, a separation membrane precursor solution is applied onto the surface of cells formed in a porous monolith substrate, thus forming a separation membrane precursor containing the precursor solution on the surface of the cells. Subsequently, the formed separation membrane precursor is dried by ventilation drying. Next, the monolith substrate in which the cells having the surface on which the dried separation membrane precursor is provided is used, and the precursor solution is applied onto the surface of the cells once again in the same manner as the above, thus further forming a separation membrane precursor containing the precursor solution. In the second membrane forming step, the precursor solution is applied on the surface of the dried separation membrane precursor, and consequently two layers of the separation membrane precursor are stacked. The two-layered separation membrane precursor is dried by ventilation drying once again. When the membrane forming step and the drying step are regarded as a set of steps, and the set of steps is repeated three or more times, the monolith substrate after the completion of the second drying step is used to undergo the third membrane forming step and the third drying step.

Each step of the separation membrane manufacturing method of the embodiment will next be described in further detail.

(1-1) Membrane Forming Step

Figure 2:
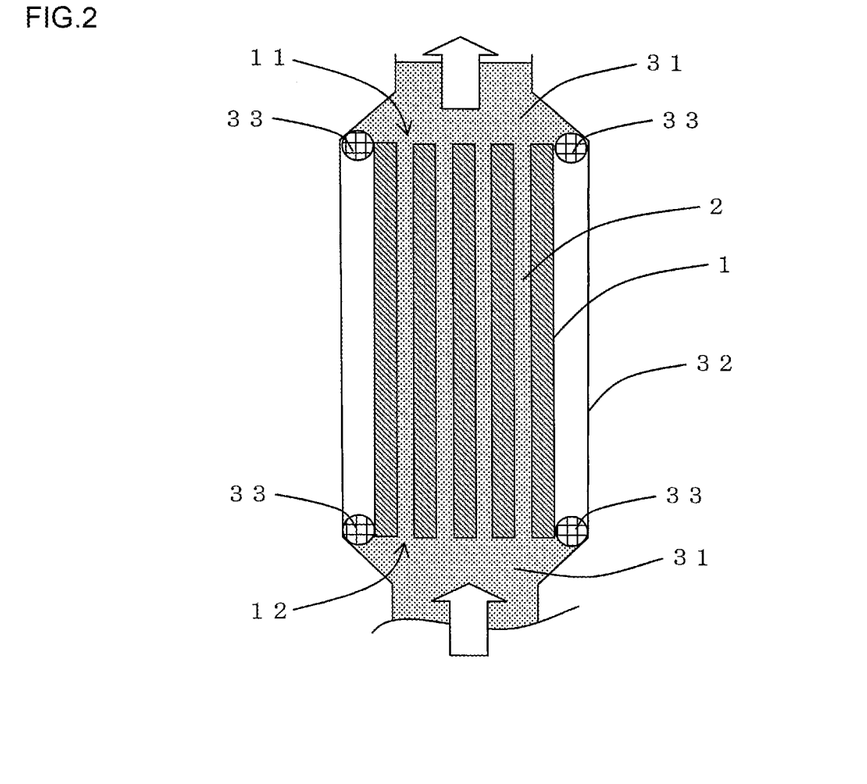
FIG. 2 is an explanatory diagram illustrating an example of a membrane forming step in an embodiment of the separation membrane manufacturing method of the present invention.

In the separation membrane manufacturing method of the embodiment, as shown in FIG. 2, a separation membrane precursor solution 31 is first applied onto the surface of cells 2 formed in a porous monolith substrate 1, thus forming a separation membrane precursor containing the precursor solution 31 on the surface of the cells 2. FIG. 2 is an explanatory diagram illustrating an example of the membrane forming step in an embodiment of the separation membrane manufacturing method of the present invention.

FIG. 2 illustrates an example of the membrane forming step. In the example, a monolith substrate 1 is placed in a tubular, membrane forming container 32 having both ends open in the longitudinal direction, and a precursor solution 31 is allowed to flow from a second end face 12 of the monolith substrate 1 into the cells 2. When the monolith substrate 1 is placed in the membrane forming container 32, annular sealing members 33 such as gaskets are preferably used at a first end face 11 and the second end face 12 of the monolith substrate 1, thus air-tightly fixing the substrate in the membrane forming container 32. Such a membrane forming step is also called a membrane forming step using dip membrane forming method. FIG. 2 illustrates an example of allowing the precursor solution 31 flow from the second end face 12 of the monolith substrate 1 into the cells 2, however the precursor solution 31 may be allowed to flow from the first end face 11 of the monolith substrate 1. In addition, the membrane forming step in the separation membrane manufacturing method of the embodiment is not limited to the membrane forming step including dip membrane forming as shown in FIG. 2. In other words, any membrane forming steps among conventionally known separation membrane manufacturing methods can suitably be used as long as the precursor solution can be applied on the surface of the cells to form the separation membrane precursor containing the precursor solution. Examples of another membrane forming step include a membrane forming step using a pouring-flowing method or the like.

In the membrane forming step using dip membrane forming method, for example, a liquid feed pump is more preferably used to send the precursor solution from the second end face of the monolith substrate into each cell in the monolith substrate at a flow rate of about 0.3 to 300 cm/min.

Figure 3:
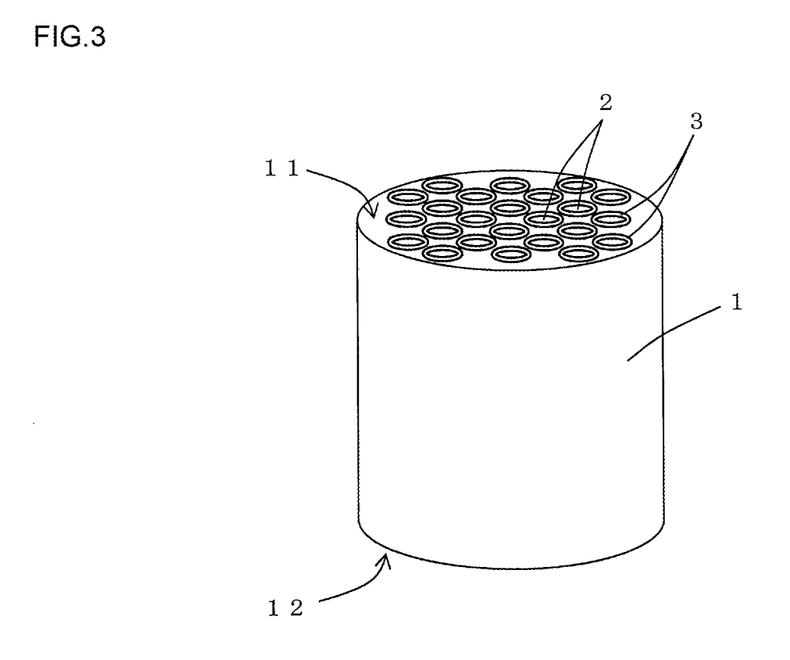
FIG. 3 is a schematic perspective view illustrating a monolith substrate having a separation membrane precursor obtained in the membrane forming step.

In the membrane forming step of the separation membrane manufacturing method of the embodiment, the monolith substrate 1 is preferably disposed in the membrane forming container 32 in a manner that the first end face 11 of the monolith substrate 1 is above the second end face 12 as shown in FIG. 2. In the membrane forming step, the angle between the extending direction of the cells 2 in the monolith substrate 1 and the vertical direction preferably ranges from −10° to 10°. In the membrane forming step, the angle between the extending direction of the cells 2 in the monolith substrate 1 and the vertical direction is more preferably as close as possible to 0°. By such a process, a monolith substrate 1 in which the separation membrane precursor 3 containing the precursor solution is formed on the surface of the cells 2 in the monolith substrate 1 can be obtained as shown in FIG. 3. FIG. 3 is a schematic perspective view illustrating the monolith substrate having the separation membrane precursor obtained in the membrane forming step.

The separation membrane precursor solution used in the membrane forming step is preferably a polyimide solution. The polyimide solution is prepared by dissolving a polyimide resin in an appropriate organic solvent such as N-methyl-2-pyrrolidone (NMP). The concentration of the polyimide in the polyimide solution is not particularly limited however is preferably 1 to 15% by mass in terms that the precursor solution has such a viscosity that a membrane is easily formed.

The separation membrane precursor solution used in the membrane forming step is most preferably a polyamic acid solution that has been widely used to manufacture separation membranes (carbon membranes). The polyamic acid solution is prepared by dissolving a polyamic acid that is a precursor of a polyimide resin in an appropriate organic solvent such as N-methyl-2-pyrrolidone (NMP) and N,N-dimethylacetamide (DMAc). The concentration of the polyamic acid in the polyamic acid solution is not particularly limited however is preferably 1 to 20% by mass in terms that the solution has such a viscosity that a membrane is easily formed. The concentration of the polyamic acid in the polyamic acid solution is more preferably 3 to 15% by mass, particularly preferably 5 to 10% by mass.

In the present invention, the term "monolith substrate" means a lotus-root-like or honeycomb-like substrate prepared by forming a plurality of cells in a columnar substrate having a first end face and a second end face, where the cells serve as channels for a fluid and extend from the first end face to the second end face. Hereinafter the first end face and the second end face of the monolith substrate may collectively be called "end face". Preferred examples of the material of the monolith substrate include ceramic materials such as alumina, silica, cordierite, mullite, titania, zirconia, and silicon carbide in the viewpoint of strength and chemical stability. The monolith substrate preferably has a porosity of 25 to 55% in terms of the strength and the permeability of the porous substrate. The porous substrate preferably has an average pore diameter of 0.005 to 5 μm. The porosity and the average pore diameter of the porous substrate are determined with a mercury porosimeter.

The shape of the monolith substrate is preferably a cylinder shape, and the cross section of the monolith substrate perpendicular to the cell extending direction is preferably a circular, elliptical, or polygonal shape, for example. The monolith substrate preferably has an entire outer diameter of 10 to 300 mm, more preferably 20 to 250 mm, particularly preferably 30 to 200 mm. If having an entire outer diameter of less than 10 mm, the monolith substrate may include a smaller number of cells. If having an entire outer diameter of more than 300 mm, the monolith substrate becomes too large. Hence, the separation membrane may be difficult to be manufactured. In the present description, when the shape of the cross section perpendicular to the cell extending direction of the monolith substrate is circular, the term "entire outer diameter of the monolith substrate" means the diameter of the cross section (that is, the circle). When the shape of the cross section perpendicular to the cell extending direction of the monolith substrate is not circular, the term "entire outer diameter of the monolith substrate" means the diameter of a circle that has a cross-sectional area equal to that of the cross section.

The monolith substrate preferably has a length of 30 to 2,000 mm, more preferably 100 to 1,700 mm, particularly preferably 200 to 1,500 mm, along the cell extending direction. If the monolith substrate has a length of less than 30 mm along the cell extending direction, the separation membrane may have a small area. If having a length of more than 2,000 mm along the cell extending direction, the monolith substrate may be difficult to be manufactured and to be handled. In consideration of the membrane area per volume and the strength, the number of cells formed in the monolith substrate is preferably 1 to 10,000, more preferably 10 to 5,000, particularly preferably 30 to 2,000. If the number of cells is more than 10,000, the monolith substrate may be difficult to be manufactured and to be handled.

In the membrane forming step, it is preferable that an outer peripheral surface of the monolith substrate is sealed with a sealing tape or a similar member, and then the membrane formation is performed. Such a constitution can prevent the precursor solution from adhering to any area other than the surface of the cells when the precursor solution is passed through the cells.

(1-2) Drying Step

Figure 4:
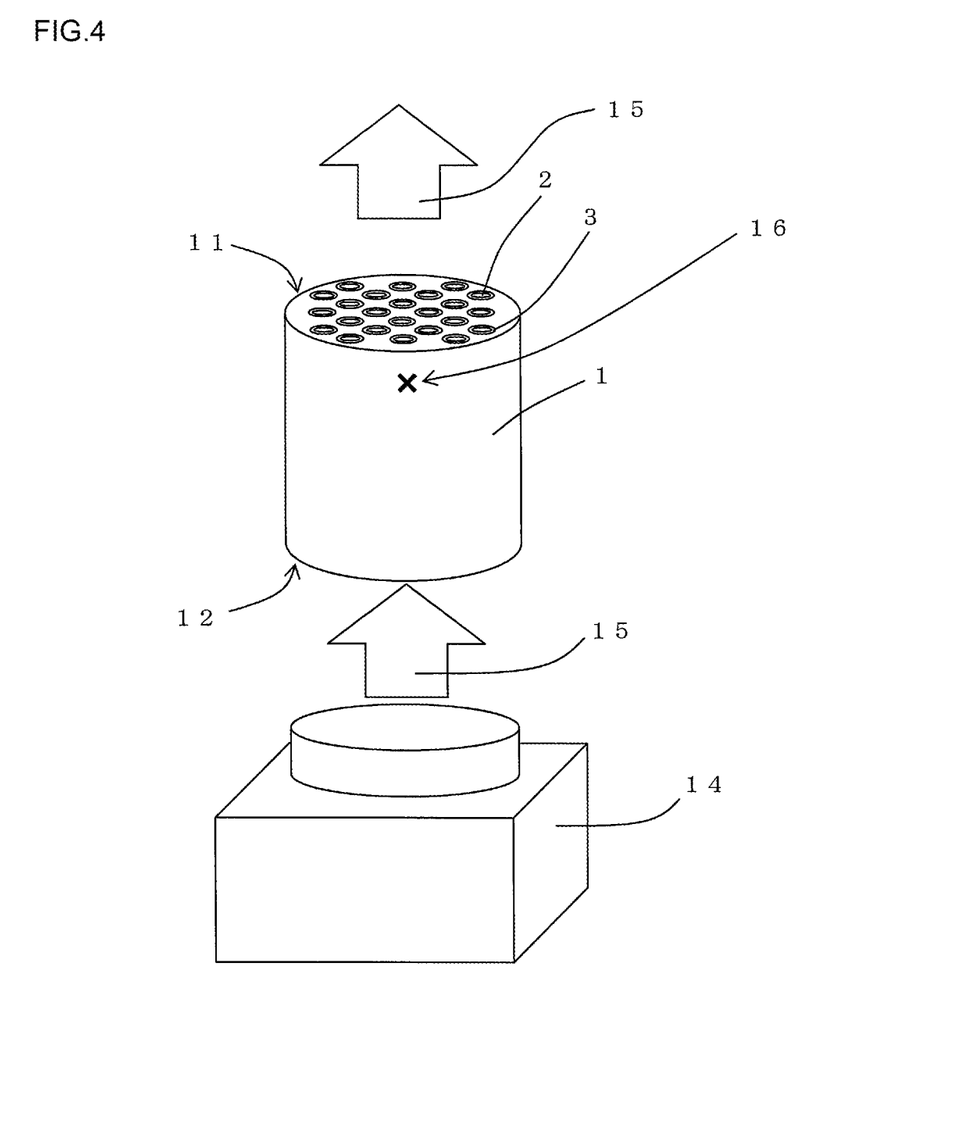
FIG. 4 is an explanatory diagram illustrating an example of a drying step in an embodiment of the separation membrane manufacturing method of the present invention.

In the separation membrane manufacturing method of the embodiment, after the membrane forming step, a drying step of drying the formed separation membrane precursor is performed. Specifically, as shown in FIG. 4, ventilation drying is performed by passing hot air 15 through the cells 2 having the separation membrane precursor 3 in the monolith substrate 1, thus drying the separation membrane precursor 3. The drying of the separation membrane precursor 3 by the ventilation drying allows the separation membrane precursor 3 to be successfully dried while heat is uniformly transferred from the surface of the separation membrane precursor 3 to the entire separation membrane precursor 3. Therefore, the entire separation membrane precursor 3 can be evenly, uniformly dried. Here, FIG. 4 is an explanatory diagram illustrating an example of the drying step in an embodiment of the separation membrane manufacturing method of the present invention.

In the separation membrane manufacturing method of the embodiment, during the ventilation drying in the drying step, the temperature of the monolith substrate having the separation membrane precursor is raised to 90° C. within 15 minutes from the start of the passing of the hot air at such a rate of temperature rise that the average rate of temperature rise is 7° C./min or more from the start of the passing of the hot air until the temperature reaches 90° C. Hereinafter the term "average rate of temperature rise from the start of the passing of the hot air until the temperature reaches 90° C." may simply be called "average rate of temperature rise" of a monolith substrate. If the average rate of temperature rise of the monolith substrate is less than 7° C./min, the temperature of the monolith substrate is not rapidly raised, and thus the resulting separation membrane has a lower denseness. If the time until the temperature of the monolith substrate reaches 90° C. exceeds 15 minutes, the resulting separation membrane also has a lower denseness.

During the ventilation drying, the average rate of temperature rise is preferably 7 to 100° C./min from the start of the passing of the hot air until the temperature reaches 90° C. If the average rate of temperature rise of the monolith substrate is excessively high, the molecular structure of the raw material constituting the separation membrane precursor may be decomposed during the ventilation drying. For example, if the average rate of temperature rise is lower than 100° C./min, the molecular structure of a raw material constituting the separation membrane precursor is unlikely to be decomposed. The average rate of temperature rise is more preferably 40° C./min or lower.

In the separation membrane manufacturing method of the embodiment, the "average rate of temperature rise of the monolith substrate" is an average of rates of temperature rise determined at the hardest position at which the temperature rises from the start of the passing of the hot air until the temperature reaches 90° C. As the method of measuring the average rate of temperature rise of the monolith substrate, for example, first, a thermocouple is fixed on the hardest position at which the temperature rises during the ventilation drying on the monolith substrate. The monolith substrate is subjected to the ventilation drying passing hot air, and the temperature is measured with the thermocouple. On the basis of the time until the temperature of the monolith substrate reaches 90° C., the "average rate of temperature rise of the monolith substrate" can be determined. The hardest position at which the temperature rises on the monolith substrate is exemplified by the "outflow side end face of the monolith substrate" from which the hot air having passed through the monolith substrate is discharged during the ventilation drying. For example, when hot air is sent from the second end face of the monolith substrate and the hot air is discharged from the first end face of the monolith substrate, the first end face of the monolith substrate is the "outflow side end face of the monolith substrate". To determine the average rate of temperature rise of the monolith substrate, the thermocouple is preferably fixed on the "outflow side end face of the monolith substrate" to measure the temperature. The vicinity of the outflow side end face on the outer surface of the monolith substrate is also exemplified as the hardest position at which the temperature rises. For example, the position with the "cross symbol" indicated by reference number 16 in FIG. 4 is exemplified as the measurement point of the average rate of temperature rise of the monolith substrate.

During the measurement of the average rate of temperature rise of the monolith substrate, immediately after the start of passing of hot air, the temperature rises at a certain rate. However, the inside of the monolith substrate is wet with the precursor solution, and thus the heat of vaporization reduces the rate of temperature rise. The ventilation drying is then continuously performed to evaporate the precursor solution, and thus the rate of temperature rise increases (accelerates). The temperature at which the rate of temperature rise accelerates as above is about 90° C. Therefore, by determining an average rate of temperature rise from the start of the passing of the hot air until the temperature reaches 90° C., the drying conditions during the ventilation drying can be specified.

In an example of the drying step shown in FIG. 4, a dryer 14 is disposed at the side of the second end face 12 of the monolith substrate 1, and hot air 15 is sent from the dryer 14 toward the second end face 12 of the monolith substrate 1 to perform the ventilation drying. By sending the hot air 15 as described above, the hot air 15 heated at a predetermined temperature is sent from open ends of the cells 2 on the second end face 12 of the monolith substrate 1. The hot air 15 having passed through the cells 2 is then discharged from other open ends of the cells 2 on the first end face 11 of the monolith substrate 1. By passing the hot air 15 (ventilation gas) through the cells 2 in this manner, the separation membrane precursor 3 formed on the surface of the cells 2 is dried. During such ventilation drying, the entire separation membrane precursor 3 such as a polyamic acid membrane is uniformly heated by the hot air 15, and the drying and the imidization uniformly progress from the surface of the separation membrane precursor 3. In the drying step as shown in FIG. 4, the diameter of an outlet of the dryer 14 is preferably the same as the size of the second end face 12 of the monolith substrate 1. The monolith substrate 1 is then preferably disposed in a manner that the position of the outlet of the dr-dryer 14 corresponds to the position of the second end face 12 of the monolith substrate 1, and the hot air 15 is preferably sent from the dryer 14 toward the second end face 12 of the monolith substrate 1.

In the ventilation drying, the temperature of hot air (namely, ventilation gas) passing through the cells is as described below. In other words, the temperature is such a temperature that the temperature of the monolith substrate having the separation membrane precursor is raised to 90° C. within 15 minutes from the start of the passing of the hot air at such a rate of temperature rise that the average rate of temperature rise is 7° C./min or more from the start of the passing of the hot air until the temperature reaches 90° C. A specific temperature of the hot air is preferably, appropriately set in consideration of a heat capacity of the monolith substrate and a speed of the hot air, for example. However, hot air at an excessively low temperature may be difficult to achieve an average rate of temperature rise of 7° C./min or more. Hot air at an excessively high temperature may decompose the molecular structure of a raw material constituting the separation membrane precursor. In the separation membrane manufacturing method of the embodiment, the hot air may have any temperature that can achieve "such a rate of temperature rise that the average rate of temperature rise is 7° C./min or more" described above, and the temperature of the hot air preferably ranges from 80° C. to 180° C., for example.

The speed of the hot air is preferably, appropriately set in consideration of a heat capacity of the monolith substrate and a temperature of the hot air, for example. As above, in the separation membrane manufacturing method of the embodiment, the hot air may have any speed that can achieve "such a rate of temperature rise that the average rate of temperature rise is 7° C./min or more" described above. For example, the speed of the hot air preferably ranges from 4 to 12 m/s.

In the separation membrane manufacturing method of the embodiment, the temperature of the monolith substrate having the separation membrane precursor is preferably raised to 90° C. within 60 minutes from the start of the applying of the precursor solution onto the surface of the cells. In other words, the time required from the start of the applying of the precursor solution in the membrane forming step until the temperature of the monolith substrate is raised to 90° C. during the ventilation drying in the drying step is preferably within 60 minutes. The "time required until the temperature of the monolith substrate is raised to 90° C." includes the time after the completion of the membrane forming step until the start of the drying step. Such a structure can further suppress infiltration of the precursor solution into the monolith substrate. The effect of suppressing the infiltration into the monolith substrate is extremely increased particularly in the first membrane forming step because the precursor solution is directly applied on the surface of the cells formed in the monolith substrate.

The time from the completion of the membrane forming step until the start of the drying step is preferably as short as possible. In other words, preferably minimum waste time is set for such a waste time of temporarily hold the monolith substrate having the separation membrane precursor between the membrane forming step and the drying step.

When the precursor solution is a polyamic acid solution, the separation membrane precursor is preferably dried and imidized in the drying step. To imidize the separation membrane precursor, it is preferable that the temperature of the monolith substrate is raised to 90° C. and then the temperature be further raised to imidize the separation membrane precursor.

If the monolith substrate 1 has a large entire outer diameter of 100 to 200 mm and a large length along the cell extending direction of 200 to 2,000 mm, the monolith substrate may be thermally expanded on the imidization of the separation membrane precursor to be cracked. Therefore, the imidization is not necessarily carried out by the ventilation drying, but imidization drying means (imidization furnace) capable of controlling the rate of temperature rise may be used.

As described above, if a single set of the membrane forming step and the drying step fails to achieve a desired thickness of the separation membrane precursor after the drying, the membrane forming step and the drying step may be repeated a plurality of times (for example, three to five times) until the membrane obtains the desired thickness. When the membrane forming step and the drying step are repeated, the separation membrane manufacturing method of the embodiment can reduce the number of repetition times as compared with conventional manufacture methods. The thickness of the separation membrane precursor after drying is appropriately set in consideration of a thickness of the resulting separation membrane.

(1-3) Carbonization Step

The separation membrane manufacturing method of the embodiment may further comprise a carbonization step of thermally decomposing the separation membrane precursor dried in the drying step to be carbonized, yielding a separation membrane. The carbonization step is a step performed when the separation membrane to be manufactured is a carbon membrane.

For example, when the precursor solution is a polyamic acid solution, the separation membrane precursor obtained through the membrane forming step and the drying step is imidized to give a polyimide membrane, and the obtained polyimide membrane is thermally decomposed to be carbonized, thus yielding a separation membrane (carbon membrane).

When the membrane forming step and the drying step are repeated a plurality of times, the carbonization step is preferably performed after the membrane forming step and the drying step are completely repeated to give the separation membrane precursor having a desired thickness.

The carbonization step is preferably performed under vacuum or under a reducing atmosphere such as a nitrogen atmosphere and an argon atmosphere. The carbonization step is preferably performed at a temperature of 400 to 1,000° C. The dried separation membrane precursor (more specifically, polyimide membrane) is thermally decomposed in such a temperature range to be carbonized, and consequently a separation membrane can be obtained. For example, carbonization at a temperature of lower than 400° C. leads to insufficient carbonization of the polyimide membrane, and this may deteriorate the selectivity or the permeation rate as a molecular-sieve membrane. Carbonization at a temperature of higher than 1,000° C. may lead to a reduction in the pore diameter of the separation membrane to reduce the permeation rate.

The resulting separation membrane preferably has a thickness of 0.1 to 10 μm, more preferably 0.1 to 3 μm. A separation membrane having an insufficient thickness of less than 0.1 μm is difficult to achieve sufficient selectivity. A separation membrane having an excessive thickness of more than 10 μm may give an excessively low permeation rate.

The separation membrane manufactured by the separation membrane manufacturing method of the embodiment may be used in any application. For example, the separation membrane manufactured by the separation membrane manufacturing method of the embodiment achieves high separation performance when used to separate ethanol and water. Such a separation membrane can be suitably used as the separation membrane for recovering the ethanol from a liquid mixture containing water and ethanol obtained from biomass.

EXAMPLES

The present invention will next be described in further detail with reference to examples, but the invention is not limited to the examples.

Example 1

First, a porous monolith substrate was prepared as the substrate for manufacturing a separation membrane. The monolith substrate was made from alumina. The shape of the monolith substrate was a cylindrical shape having a first end face and a second end face. The diameter of the first end face and the second end face of the monolith substrate was 30 mm, and the length along the cell extending direction was 160 mm. In the monolith substrate, 55 cells extending from the first end face to the second end face were formed. The shape of the open ends of the cells was circular. The opening of a single cell had an area of 5 $mm^2$.

Before the membrane forming step, a sealing tape was wound around the outer peripheral surface of the monolith substrate to prevent precursor solution from adhering to any area other than the surface of the cells in the monolith substrate.

Such a monolith substrate was disposed in a manner that the cell extending direction was in the vertical direction, and a liquid feed pump was used to send a precursor solution into each cell (membrane forming step). The precursor solution used was a polyamic acid solution with a polyamic acid concentration of 10% by mass in N-methyl-2-pyrrolidone (NMP) as a solvent (U-varnish-A (trade name) manufactured by Ube Industries, Ltd.). To send the precursor solution, the precursor solution was sent from one open end of each cell at a rate of 1 cm/min. By such a membrane forming step, a polyamic acid membrane was formed as the separation membrane precursor in the cells in the monolith substrate.

Next, ventilation drying was performed by passing hot air through the cells having the polyamic acid membrane in the monolith substrate, thus drying the polyamic acid membrane (drying step). In Example 1, the hot air was sent during the ventilation drying in a manner that the average rate of temperature rise was 25° C./min from the start of the passing of the hot air until the temperature reached 90° C. The temperature of the hot air was 120° C. The speed of the hot air was 5 m/s. The time until the temperature of the monolith substrate reached 90° C. was 4 minutes. The ventilation drying was continuously performed after the temperature of the monolith substrate reached 90° C. By such a drying step, the polyamic acid membrane was dried and imidized.

Figure 5:
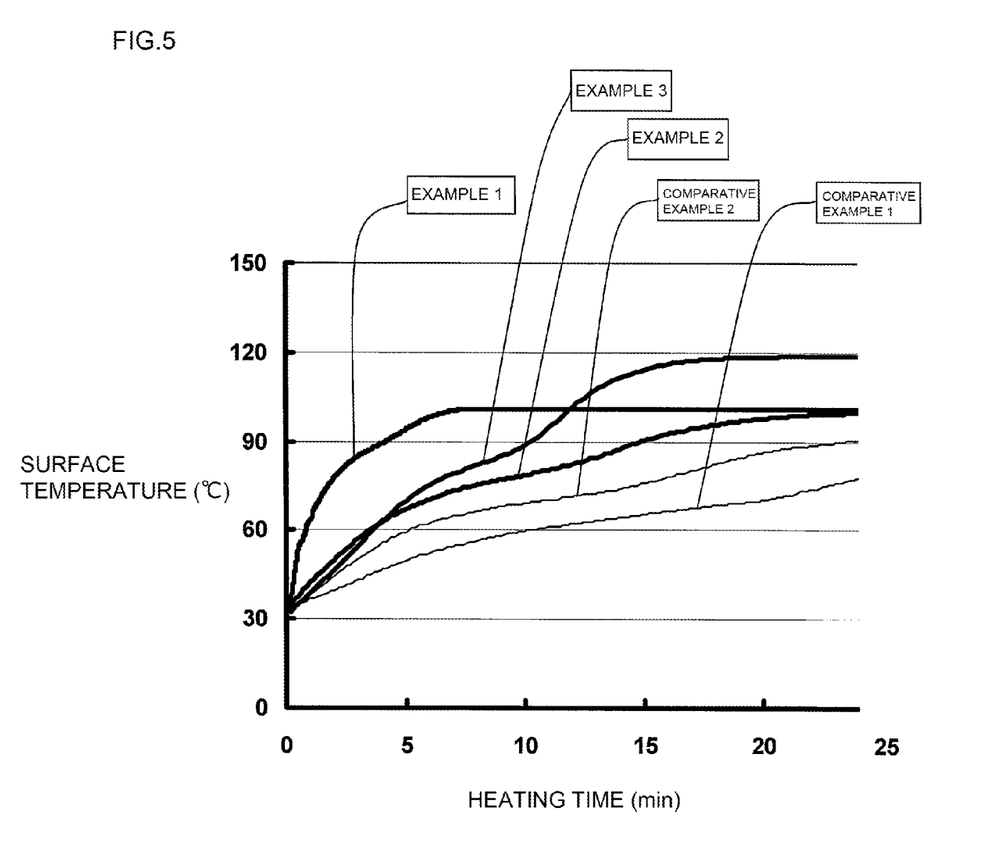
FIG. 5 is a graph illustrating heating times and surface temperatures in the drying step in each separation membrane manufacturing method of Examples 1 to 3 and Comparative Examples 1 and 2.

FIG. 5 is a graph illustrating heating times and surface temperatures in the drying step in each separation membrane manufacturing method of Examples 1 to 3 and Comparative Examples 1 and 2. In FIG. 5, the horizontal axis represents heating time (min), and the vertical axis represents surface temperature (° C.). The "surface temperature (° C.)" in FIG. 5 is a temperature at the vicinity of the end face at the hot-air outflow side on the outer surface of the monolith substrate.

In the separation membrane manufacturing method of Example 1, the membrane forming step and the drying step were repeated three times. The monolith substrate was then heated at 800° C. in a vacuum box furnace, and the polyimide membrane obtained by imidization in the drying step was carbonized, thus yielding a separation membrane (carbon membrane). The first end face and the second end face of the monolith substrate in which the separation membrane was formed on the inner surface of the cells were sealed with silicone, respectively.

Table 1 shows the diameter (mm) and the length (mm) of the monolith substrate. Table 1 also shows the average rate of temperature rise (° C./min) of the monolith substrate, the temperature (° C.) of hot air, and the speed (m/s) of hot air during the ventilation drying. The time until the temperature of the monolith substrate reaches 90° C. is shown in the field "90° C. reaching time (min)" in Table 1. The "number of membrane formation times" in Table 1 is the number of times of the membrane forming step performed in each of Examples and Comparative Examples. In other words, the "number of membrane formation times" in Table 1 is the number of repetition times of the membrane forming step and the drying step performed in each Examples and Comparative Examples.

To evaluate the separation performance of the separation membrane obtained in Example 1, a pervaporation test was performed in the following manner.

[Pervaporation Test]

Figure 6:
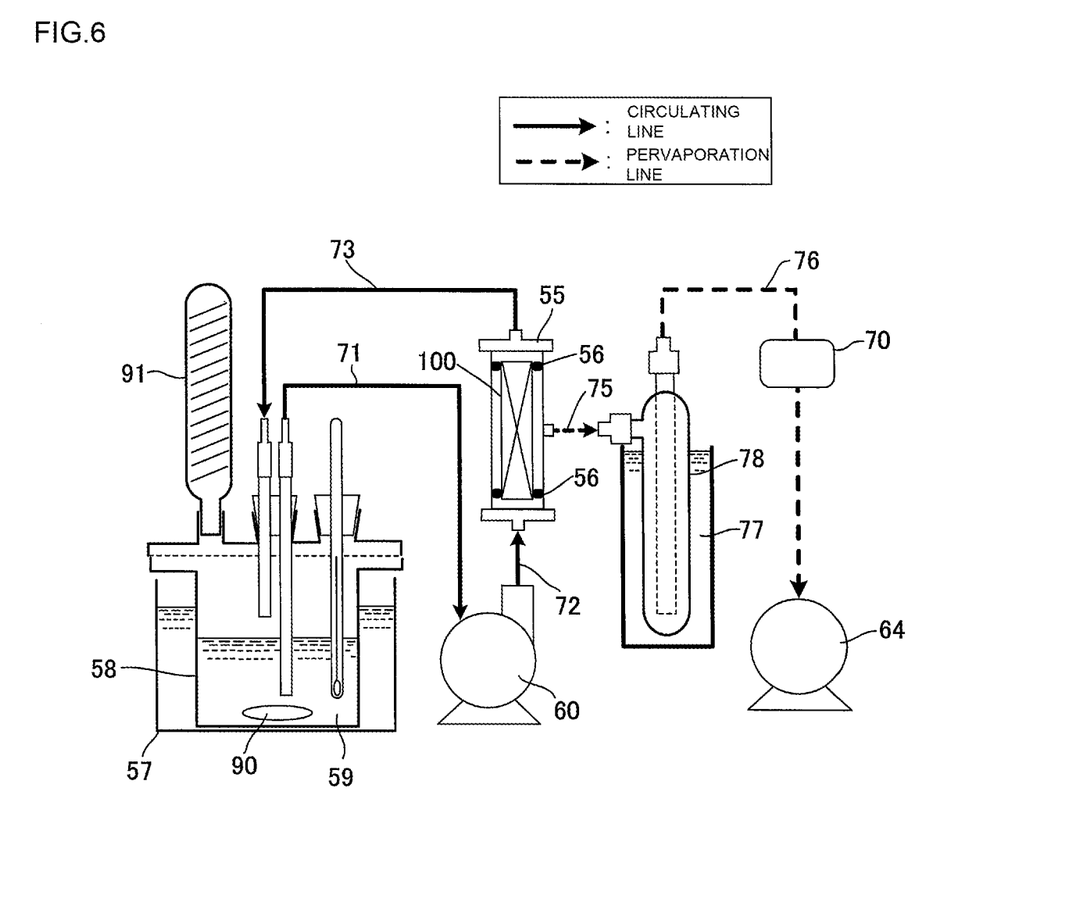
FIG. 6 is a schematic view of a pervaporation apparatus used for evaluation of water/ethanol separation performance in the examples.

The pervaporation test was performed with a pervaporation apparatus as shown in FIG. 6. FIG. 6 is a schematic view of the pervaporation apparatus used for evaluation of water/ethanol separation performance in the examples. As shown in FIG. 6, the monolith substrate 100 having the separation membrane was placed in a cylindrical container 55, and the clearance between the inner circumference of the container 55 and the monolith substrate was sealed around the outer circumference of each end of the monolith substrate 100 with a sealing member 56. A feed liquid 59 warmed at a predetermined temperature in a beaker 58 placed in a thermostat bath 57 was circulated through circulating lines 71 to 73 using a circulating pump 60 and thus was passed through the cells in the monolith substrate 100 in the container 55 that was disposed in midstream of the circulating lines 71 to 73.

In this manner, while the feed liquid 59 was brought into contact with the separation membrane formed on the surface of the cells in the monolith substrate 100, the outside, namely the permeation side, of the monolith substrate 100 was evacuated with a vacuum pump 64 through pervaporation lines 75 and 76. A vacuum control unit 70 was used to control the decompression of pressure at the secondary side, and a permeated vapor permeated through the separation membrane was trapped as a permeated liquid in a cold trap 78 soaked in liquid nitrogen 77 on pervaporation lines 75 and 76.

In FIG. 6, reference number 90 is a stirrer for stirring the feed liquid 59, and reference number 91 is a cooling tube attached to the upper part of the beaker 58. The feed liquid 59 used was a water/ethanol mixed solution with a water/ethanol ratio (mass ratio) of 10/90, and the feed liquid at a temperature of 70° C. was used to evaluate the water/ethanol separation performance of the separation membrane. For the evaluation of the separation performance, the ethanol permeation rate (kg/m$^2$h) and the water permeation rate (kg/m$^2$h) were used. The ethanol permeation rate (kg/m$^2$h) and the water permeation rate (kg/m$^2$h) were shown in Table 1.

Examples 2 and 3

In Examples 2 and 3, each separation membrane was manufactured by using a monolith substrate having the

TABLE 1

| | Monolith substrate | | Temperature rise rate (° C./min) | 90° C. reaching time (min) | Hot air temperature (° C.) | Hot air speed (m/s) | Number of membrane formation times (times) | Ethanol permeation rate (kg/m$^2$h) | Water permeation rate (kg/m$^2$h) |
|---|---|---|---|---|---|---|---|---|---|
| | Diameter (mm) | Length (mm) | | | | | | | |
| Example 1 | 30 | 160 | 25 | 4 | 120 | 5 | 3 | 0.29 | 1.36 |
| Example 2 | 30 | 1000 | 7 | 15 | 120 | 8 | 3 | 0.60 | 1.53 |
| Example 3 | 180 | 1000 | 10 | 10 | 120 | 6 | 3 | 0.68 | 1.82 |
| Comparative Example 1 | 30 | 1000 | 3 | 30 | 120 | 5 | 5 | 0.67 | 1.28 |
| Comparative Example 2 | 30 | 1000 | 5 | 23 | 120 | 6 | 4 | 0.64 | 1.39 |
| Comparative Example 3 | 180 | 1000 | 3 | 35 | 80 | 4 | 5 | 0.84 | 1.93 |
| Comparative Example 4 | 30 | 1000 | 5 | 23 | 120 | 6 | 3 | 1.16 | 1.71 |
| Comparative Example 5 | 180 | 1000 | 3 | 35 | 80 | 4 | 3 | 1.34 | 1.53 | diameter and the length as shown in Table 1. In Example 2, during the ventilation drying in the drying step, hot air was sent in a manner that the average rate of temperature rise was 7° C./min from the start of the passing of the hot air until the temperature reached 90° C. In Example 3, during the ventilation drying in the drying step, hot air was sent in a manner that the average rate of temperature rise was 10° C./min from the start of the passing of the hot air until the temperature reached 90° C. The average rate of temperature rise (° C./min) and the speed (m/s) of hot air are shown in Table 1. The shape of the monolith substrate used in Example 3 was a cylindrical shape having a first end face and a second end face, the diameter of the first end face and the second end face of the monolith substrate was 180 mm, and the length along the cell extending direction was 1,000 mm. In the monolith substrate, 1,600 cells extending from the first end face to the second end face were formed. The shape of the open ends of the cells was circular. The opening of a single cell had an area of 5 mm$^2$.

The diameter (mm) and the length (mm) of the monolith substrate used in each separation membrane manufacturing method of Examples 2 and 3 are shown in Table 1. The average rate of temperature rise (° C./min) of the monolith substrate, the temperature (° C.) of hot air, and the speed (m/s) of hot air during the ventilation drying are also shown in Table 1. The time until the temperature of the monolith substrate reaches 90° C. is shown in the field "90° C. reaching time (min)" in Table 1.

The ethanol permeation rate (kg/m$^2$h) and the water permeation rate (kg/m$^2$h) of the separation membrane obtained by each separation membrane manufacturing method of Examples 2 and 3 were determined in the same manner as in Example 1. The measurement results are shown in Table 1.

Comparative Examples 1 to 5

In Comparative Examples 1 to 5, each separation membrane was manufactured by using a monolith substrate having the diameter and the length as shown in Table 1. In Comparative Examples 1 and 3, the membrane forming step and the drying step were repeated five times, yielding respective separation membranes. In Comparative Example 2, the membrane forming step and the drying step were repeated four times, yielding a separation membrane. In Comparative Examples 4 and 5, the membrane forming step and the drying step were repeated three times, yielding respective separation membranes. In Comparative Examples 1 to 5, during the ventilation drying in the drying step, hot air was sent in a manner that each average rate of temperature rise from the start of the passing of the hot air until the temperature reached 90° C. was as shown in Table 1.

The diameter (mm) and the length (mm) of the monolith substrate used in each separation membrane manufacturing method of Comparative Examples 1 to 5 are shown in Table 1. The average rate of temperature rise (° C./min) of the monolith substrate, the temperature (° C.) of hot air, and the speed (m/s) of hot air during the ventilation drying are also shown in Table 1. The time until the temperature of the monolith substrate reaches 90° C. is shown in the field "90° C. reaching time (min)" in Table 1.

The ethanol permeation rate (kg/m$^2$h) and the water permeation rate (kg/m$^2$h) of the separation membrane obtained by each separation membrane manufacturing method of Comparative Examples 1 to 5 were determined in the same manner as in Example 1. The measurement results are shown in Table 1.

(Results)

As shown in Table 1, the separation membrane manufacturing methods of Examples 1 to 3 were able to yield the separation membranes having good separation performance even when the number of membrane formation times was three. In contrast, the separation membrane manufacturing methods of Comparative Examples 4 and 5, in which the number of membrane formation times was the same as those in Examples 1 to 3, yielded the separation membranes having poor separation performance. In other words, it was revealed that the separation membrane manufacturing method of the present invention can reduce the number of membrane formation times as compared with the conventional separation membrane manufacturing methods.

INDUSTRIAL APPLICABILITY

The present invention can be suitably applied to manufacture a separation membrane used for separation of various mixtures, for example, for separation of ethanol and water in biomass fields.

DESCRIPTION OF REFERENCE NUMERALS

1: monolith substrate, 2: cell, 3: separation membrane precursor, 11: first end face, 12: second end face, 14: dryer, 15: hot air, 16: measurement point of the average rate of temperature rise of a monolith substrate, 31: precursor solution, 32: membrane forming container, 33: sealing member, 55: container, 56: sealing member, 57: thermostat bath, 58: beaker, 59: feed liquid, 60: circulating pump, 64: vacuum pump, 70: vacuum control unit, 71, 72, 73: circulating line, 75, 76: pervaporation line, 77: liquid nitrogen, 78: cold trap, 90: stirrer, 91: cooling tube, 100: monolith substrate (monolith substrate having a separation membrane)

The invention claimed is:

1. A separation membrane manufacturing method comprising:
    a membrane forming step of applying a separation membrane precursor solution on a surface of cells formed in a porous monolith substrate to form a separation membrane precursor containing the precursor solution on the surface of the cells; and
    a drying step of performing ventilation drying by passing hot air through the cells having the separation membrane precursor in the monolith substrate to dry the separation membrane precursor,
    wherein the precursor solution is a polyamic acid solution; and
    wherein, during the ventilation drying in the drying step, a temperature of the monolith substrate having the separation membrane precursor is raised to 90° C. within 15 minutes from the start of the passing of the hot air at such a rate of temperature rise that an average rate of temperature rise is from 7° C./min to 40° C./min from the start of the passing of the hot air until the temperature reaches 90° C.

2. The separation membrane manufacturing method according to claim 1, wherein the separation membrane precursor is dried and imidized in the drying step.

3. The separation membrane manufacturing method according to claim 1, wherein the temperature of the monolith substrate having the separation membrane precursor is raised to 90° C. within 60 minutes from the start of the applying of the precursor solution on the surface of the cells.

4. The separation membrane manufacturing method according to claim 1, wherein an outer peripheral surface of the monolith substrate is sealed, and then the membrane forming step is performed.

5. The separation membrane manufacturing method according to claim 1, wherein the membrane forming step and the drying step are regarded as a set of steps, the set of steps is repeated twice or more.

6. The separation membrane manufacturing method according to claim 5, wherein the temperature of the monolith substrate having the separation membrane precursor is raised to 90° C. within 60 minutes from the start of the applying of the precursor solution on the surface of the cells.

7. The separation membrane manufacturing method according to claim 5, wherein an outer peripheral surface of the monolith substrate is sealed, and then the membrane forming step is performed.

8. The separation membrane manufacturing method according to claim 5, further comprising a carbonization step of thermally decomposing the separation membrane precursor dried in the drying step to be carbonized, yielding a separation membrane.

9. The separation membrane manufacturing method according to claim 8, wherein the temperature of the monolith substrate having the separation membrane precursor is raised to 90° C. within 60 minutes from the start of the applying of the precursor solution on the surface of the cells.

10. The separation membrane manufacturing method according to claim 8, wherein an outer peripheral surface of the monolith substrate is sealed, and then the membrane forming step is performed.

11. The separation membrane manufacturing method according to claim 1, further comprising a carbonization step of thermally decomposing the separation membrane precursor dried in the drying step to be carbonized, yielding a separation membrane.

12. The separation membrane manufacturing method according to claim 11, wherein the temperature of the monolith substrate having the separation membrane precursor is raised to 90° C. within 60 minutes from the start of the applying of the precursor solution on the surface of the cells.

13. The separation membrane manufacturing method according to claim 11, wherein an outer peripheral surface of the monolith substrate is sealed, and then the membrane forming step is performed.

* * * * *